(12) United States Patent
Goodwin et al.

(10) Patent No.: US 7,290,211 B2
(45) Date of Patent: Oct. 30, 2007

(54) METHOD AND SYSTEM FOR RECONFIGURING A SELECTION SYSTEM BASED ON LAYERS OF CATEGORIES DESCRIPTIVE OF RECORDABLE EVENTS

(75) Inventors: Mark D. Goodwin, Mountain View, CA (US); Lynda Kitlyn Seto, Sunnyvale, CA (US); David Allen Westerhoff, Fremont, CA (US)

(73) Assignee: Digital Networks North America, Inc., Cupertino, CA (US)

( * ) Notice: Subject to any disclaimer, the term of this patent is extended or adjusted under 35 U.S.C. 154(b) by 136 days.

(21) Appl. No.: 11/030,422

(22) Filed: Jan. 5, 2005

(65) Prior Publication Data

US 2006/0150123 A1    Jul. 6, 2006

(51) Int. Cl.
G06F 15/00 (2006.01)
G06F 13/00 (2006.01)

(52) U.S. Cl. ................... 715/716; 715/704; 725/39
(58) Field of Classification Search ................ 715/704, 715/734, 763–765, 716–719; 725/39, 104
See application file for complete search history.

(56) References Cited

U.S. PATENT DOCUMENTS

| | | | |
|---|---|---|---|
| 6,026,398 A | 2/2000 | Brown et al. | |
| 6,167,393 A | 12/2000 | Davis, III et al. | |
| 6,505,348 B1 | 1/2003 | Knowles et al. | |
| 6,985,569 B2 | 1/2006 | Baker | |
| 2002/0174430 A1 | 11/2002 | Ellis et al. | |
| 2003/0079227 A1* | 4/2003 | Knowles et al. | 725/50 |
| 2004/0117831 A1* | 6/2004 | Ellis et al. | 725/53 |
| 2004/0170260 A1 | 9/2004 | Baker | |
| 2004/0203639 A1 | 10/2004 | Ozer et al. | |
| 2006/0146436 A1 | 7/2006 | Goodwin et al. | |
| 2006/0184984 A1 | 8/2006 | Goodwin et al. | |

OTHER PUBLICATIONS

International Search Report and Written Opinion of the International Searching Authority for International Application No. PCT/US06/00225, mailing date Jun. 19, 2007.

* cited by examiner

Primary Examiner—Cao (Kevin) Nguyen
(74) Attorney, Agent, or Firm—McDonnell Boehnen Hulbert & Berghoff LLP

(57) ABSTRACT

A method and system for selection of recordable events from among a set of recordable events, based on categories and sub-categories, that cumulatively describe a substantial portion of the entire set of recordable events. After receiving a first set of categories, and first sets of sub-categories corresponding to the first set of categories, at a device, the device is configured to use the first set of categories and the first set of sub-categories, to guide a user in selecting a series of recordable events to experience and/or record. Thereafter, the device receives a second set of categories and respective second sets of sub-categories that correspond to the categories of the second set of categories, and the device responsively configures itself to use the second set of categories and the second sets of sub-categories, to guide a user in selecting a series of recordable events to experience and/or record.

18 Claims, 8 Drawing Sheets

| DAY PART | | MONDAY | | TUESDAY | | WEDNESDAY | | THURSDAY | | FRIDAY | | SATURDAY | | SUNDAY | |
|---|---|---|---|---|---|---|---|---|---|---|---|---|---|---|---|
| 708 — | | Anthony Ant | P | Anthony Ant | P | Anthony Ant | P | Anthony Ant | P | Anthony Ant | P | Dude, Where's My Car? | P R | HBO Storybook Musicals | P |
| 702 — | | Kindergarten | P | Harold and the Purple Crayon | P | Any Given Sunday | P R | Dude, Where's My Car? | P R | Harold and the Purple Crayon | P | Harold and the Purple Crayon | P | Kindergarten | P |
| | | BBC World News | P | Family Fued | P | Kindergarten | P | BBC World News | P | BBC World News | P | HBO Storybook Musicals | P R | Arthur | P R |
| | | The View | P R | The People's Court | P R | Family Fued | P R | The View | P R | The View | P R | Golf | P | NFL Countdown | P R |
| | | The Price Is Right | P R | Jenny Jones | P R | The People's Court | P R | The Price Is Right | P R | The Price Is Right | P R | The Neverending Story | P | Hollywood Squares | P R |
| MORNING (6:00 AM TO 10:59 AM) | | Jenny Jones | P R | The Price Is Right | P R | Jenny Jones | P R | Jenny Jones | P R | Jenny Jones | P R | Arthur | P R | Dragon Tales | P |
| | | Good Morning America | P R | The Early Show | P R | The Price Is Right | P R | Good Morning America | P R | Good Morning America | P R | MiMi's Treehouse | P R | KRON 4 News Weekend | P R |
| | | Live With Regis and Kelly | P R | Martha Stewart Living | P R | The Early Show | P R | Live With Regis and Kelly | P R | Live With Regis and Kelly | P R | Hollywood Squares | P R | Wheel of Fortune | P R |
| | | Martha Stewart Living | P R | The View | P R | Martha Stewart Living | P R | Martha Stewart Living | P R | Martha Stewart Living | P R | KRON 4 News Weekend | P R | Little Lulu | P |
| | | Little Lulu | P | Live With Regis and Kelly | P | The View | P R | Little Lulu | P | Little Lulu | P | Wheel of Fortune | P R | | |
| | | 602(1) | | The Other Half | | Live With Regis and Kelly | P R | | | 704 — | | Little Lulu | P | | |
| | | | | Good Morning America | | The Other Half | P R | | | 706 — | | | | | |
| | | | | | | Good Morning America | P R | | | | | | | | |
| DAY PART | | MONDAY | | TUESDAY | | WEDNESDAY | | THURSDAY | | FRIDAY | | SATURDAY | | SUNDAY | |
| | | A Little Curious | P R | A Little Curious | P R | A Little Curious | P R | A Little Curious | P R | A Little Curious | P R | A Little Curious | P R | A Little Curious | P R |
| | | Anthony Ant | P | Anthony Ant | P R | Anthony Ant | P R | Anthony Ant | P R | Anthony Ant | P R | Any Give Sunday | P R | HBO Storybook Musicals | P R |
| | | Judge Joe Brown | P R | Harold and the Purple Crayon | P | Any Given Sunday | P R | Dude, Where's My Car? | P R | Harold and the Purple Crayon | P R | Harold and the Purple Crayon | P | Kindergarten | P R |
| | | Kindergarten | P R | Judge Joe Brown | P | Judge Joe Brown | P R | The Wild Thornberrys | P | Judge Joe Brown | P R | HBO Storybook Musicals | P | Space Cowboys | P R |
| | | Access Hollywood | P R | Talking Movies | P R | Kindergarten | P R | The Weather Channel | P R | The Soccer Show | P | Crashbox | P R | Doug | P R |
| EARLY AFTERNOON (11:00 AM TO 3:59 PM) | | BBC World News | P R | BBC World News | P R | Access Hollywood | P R | Dragon Tales | P R | EXTRA | P R | Doug | P R | George and Martha | P R |
| | | EXTRA | P R | EXTRA | P R | BBC World News | P R | Dream Builders | P R | Dragon Tales | P R | Inside the NFL | P R | Golf | P |
| | | Dragon Tales | P R | Dragon Tales | P R | EXTRA | P R | Crashbox | P R | Bay Cafe | P R | George and Martha | P R | EXTRA | P R |
| | | Bay Cafe | P R | Bay Cafe | P R | Dragon Tales | P R | Little Lulu | P R | Evening Magazine | P R | NHL Hockey | P R | Figure Skating | P R |

Figure 1
Prior Art

METHOD AND SYSTEM FOR RECONFIGURING A SELECTION SYSTEM BASED ON LAYERS OF CATEGORIES DESCRIPTIVE OF RECORDABLE EVENTS

FIELD OF THE INVENTION

The present invention relates to a graphical user interface for a recordable event recorder and, more particularly, to displaying categories and sub-categories that describe recordable events as a means to select a series of recordable events for recording.

BACKGROUND

Many systems and devices include a user interface. A user interface provides means of communication between a user and a system/device. The communication between a user and a system/device may include inputting information to the system/device and/or receiving information from the system/device.

The ability of a user to successfully use a user interface depends in part on the skills and knowledge of the user and on the design of the user interface. A first user interface having a design that is relatively simple to use does not require as much skill and knowledge to use as compared to a second user interface having a more complex design. As the design of the second user interface becomes more complex, the relative amount of user skill and user knowledge required to successfully use the second user interface increases. In some instances, the design of the user interface is so complex that the user becomes frustrated when attempting to use the user interface, and in turn, the user (i) does not use some of functions accessible by the user interface, or (ii) returns the product with the complex user interface to the product manufacturer.

An example of a user interface having relatively simple design is a plain old telephone system (POTS) telephone. Using the user interface of a POTS telephone may be as simple as (i) picking up a handset when the telephone is ringing, (ii) listening to sounds output from a handset speaker, and (iii) talking into a handset microphone. Alternatively, using the user interface of a POTS telephone may involve (i) picking up the handset, (ii) dialing a telephone number by pressing a keys of a keypad in a particular sequence, (iii) listening to sounds output from the handset speaker, and (iv) talking into the handset microphone. Using the user interface of a POTS telephone is relatively easy to learn, easy to remember, and rarely results in a user not using the user interface because of the complexity of the user interface.

An example of a user interface that is relatively more complex as compared to a POTS telephone user interface is a user interface for inputting time information for changing the time displayed on a video cassette recorder (VCR). A user interface for inputting time information may require (i) entering a VCR programming mode and then pressing some combination of keys, such as an hours key and a minutes key on a VCR keypad, or (ii) entering a programming mode via a VCR remote control and then pressing a series of keys on the remote control. Inputting time information into some VCRs may be so complex that (i) the user must refer to a user's manual in order to determine how to input the time information, or (ii) the user foregoes inputting time information. In the instance when the user foregoes inputting time information, the VCR may continue display an incorrect time and/or continue to flash a default time such as 12:00. By not inputting the time information, the user may not be able to use certain VCR functions, such as a record function that starts and ends the recording of a television show based on a time as indicated by the VCR clock.

Another user interface that may be considered complex is the user interface of a recordable event recorder, such as a digital video recorder (DVR). In particular, a portion of a recordable event recorder user interface that allows a user to select some or all of the television shows having a given title that are to be broadcast over a given time-period, may be relatively complex to use. FIG. 1 depicts a portion of a media planner that displays recommended television programs and that allows for recording any of the recommended television program by selecting the "R" tab associated with a given television program. Finding all television programs that are displayed on this media player display and that have a given title requires searching each column and row to find all such television programs. If the user overlooks one or more of the television programs displayed on the media player display having the given title, the media player will not schedule to record the overlooked programs.

Thus, it would be desirable to have a recordable event recorder user interface that allows a user to select some or all television shows having a given name that are to be broadcast over a given time-period, that is (i) relatively simple to use, and (ii) prevents human error during a user-search of a large list of data of television shows.

SUMMARY

An architecture that supports a method and system for configuring a selection system for selecting recordable events, where the selection system is based on categories of recordable events and sub-categories of the categories, is described herein. The set of categories of recordable events and the subsets of categories of recordable events are associated with at least a substantial portion of the entire set or recordable events. The categories and sub-categories are provided at a graphical user interface to facilitate a user searching for a specific recordable event or a series of recordable events. A user may view the displayed categories and sub-categories, and interact with the graphical user interface to navigate through the categories and sub-categories while searching for a recordable event or a series of recordable events, to view, and/or hear, and/or record.

Examples of recordable events include television shows and radio shows. A series of recordable events, which may include one or more recordable events, may be defined in any of a variety of manners. For example, a series of recordable events may be defined by a title of each recordable event within the series. Other manners, more complex than defining a series of recordable events based on merely a title of a recordable event, may be the manner used for defining a series of recordable events.

Reconfiguration of the selection system is available in response to receiving additional categories, sub-categories, or a criteria used for associating a recordable event within a given category and/or sub-category. Reconfiguration of the selection system may occur without updating the system hardware or program instructions that carry out the selection system. In this regard, the updated categories, updated sub-categories, and the updated criteria used for associating a recordable event within a given category and/or sub-category, received by the system may be used by the firmware and program instructions to carry out the selection system.

In one respect, a system for selection of a series of recordable events from among a set of recordable events includes (i) a communication interface for receiving a first set of categories, a respective first set of sub-categories for each of the categories in the first set of categories, and a first communication for updating the first set of categories and/or one or more of the first sets of sub-categories corresponding to the first set of categories, (ii) a processor that is communicatively coupled to the communication interface and which executes a set of program instructions, (iii) data storage that is communicatively coupled to the processor and which stores one or more sets of categories, one or more sets of sub categories, and the set of program instructions, and (iv) a user interface for displaying the first set of categories and the first set of sub-categories.

The user interface displays categories in response to receiving a first user selection signal that indicates to display a set of categories. The first signal may result from a user selecting an option from a main menu displayed on a GUI. The user interface displays sub-categories in response to receiving a second user selection signal that indicates to display a set of sub-categories. The second signal may result from a user selecting a category displayed on the GUI.

The program instructions of this system include instructions for (i) creating an updated set of categories, and in turn, for displaying the updated set of categories instead of the first set of categories, and (ii) creating an updated set of sub-categories, and in turn, displaying the updated set of sub-categories instead of a set of sub-categories from the first sets of sub-categories. The program instructions may include instructions displaying a list of recordable events that are associated with a displayed category, and/or displayed sub-category.

In another respect, a method for configuring a selection system based on categories of recordable events and sub-categories of the categories involves (i) receiving a first set of categories and a respective first set of sub-categories for each of the categories of the first set, (ii) configuring the selection system in a first mode where the selection system uses the first set of categories and the respective first sets of sub-categories to guide user selection of recordable events, (iii) receiving a second set of categories and one or more respective second sets of sub-categories for each of the categories of the second set, and (iv) reconfiguring the selection system in a second mode where the selection system uses the second set of categories and the respective second sets of sub-categories to guide user selection of recordable events.

In yet another respect, a method of selection among a set of recordable events involves (i) providing on a display of a local device, a set of categories that cumulatively describe a substantial portion of a set of recordable events, (ii) receiving a user selection of a given category of the set of categories, and (iii) displaying a set of sub-categories corresponding to the given category. The local device is configured to receive updates from a remote server. After receiving the updates, the remote server may reconfigure the categories of the set of categories and/or one or more of the sub-categories of the set of sub-categories.

These and other aspects, advantages, and alternatives will become more apparent to those of ordinary skill in the art by reading the following detailed description, with reference where appropriate to the accompanying drawings.

BRIEF DESCRIPTION OF THE DRAWINGS

Exemplary embodiments of the present invention are described herein with reference to the drawings, in which:

FIG. 1 is a prior art drawing from U.S. Patent Application Publication US 2004/0203639 that illustrates a portion of a media planner displaying recommended television programs;

DETAILED DESCRIPTION OF AN EXEMPLARY EMBODIMENT

1. Overview

Figure 2:
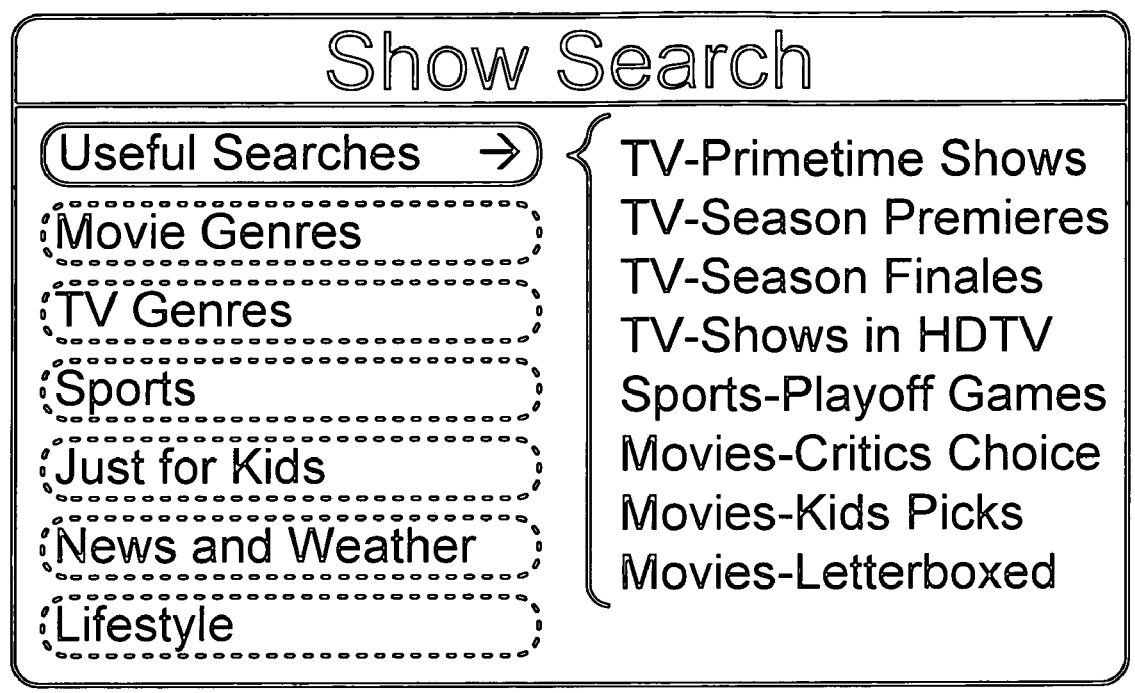
FIG. 2 depicts a GUI that displays a show search screen using seven categories.

An exemplary embodiment for selection of recordable events from among a set of recordable events, based on a set of categories and a respective set of sub-categories for each category, that cumulatively describe a substantial portion of the entire set of recordable events, is described herein. The set of categories and the respective set of sub-categories for each category may be provided to a display so as to facilitate a user in selecting a recordable event (or a series of recordable events) that are associated with a given category and a given sub-category. Selection of a recordable event allows a user to (i) experience (for example, view and/or hear) the recordable event, and/or (ii) record the recordable event. Further, a local device arranged to receive updates from a remote server may reconfigure the set of categories and/or one or more respective sets of sub-categories, based on the received updates.

A category is a broadly defined descriptor for a portion of at least a substantial portion of the entire set of recordable events. A set of categories includes more than one category. A set of categories may be defined with easily understood categories that define the entire set of recordable events or at least a substantial portion of the set of recordable events. A set of categories may be used by a user to navigate through the entire set of recordable events in order to locate a recordable event the user would like to experience or record. The set of categories can prevent a user from becoming frustrated while searching for a recordable event.

In a system that does not use a set categories and sets of sub-categories for categorizing recordable events, a user searching for a recordable event or a series of recordable events must perform the search based on a less user-friendly way of searching for the recordable events, such as the way a recordable event might be searched for using the table of television shows shown in FIG. 1. However, in a system that uses a set of categories and sets of categories for categorizing recordable events, the easily understood categories and sub-categories, and the ease of a navigating through a set of recordable events data using the categories and sub-categories, increases the user satisfaction of the system. A satisfied user will be less inclined to return the system to the seller or manufacturer of the system.

An optimum number of categories of a set of categories may be defined. The optimum number of categories may facilitate carrying out a search for a series of recordable events that result in less user dissatisfaction as compared to carrying out a search using a number of categories other than the optimum number of categories. Use of an optimum number of categories may prevent a user from becoming confused while searching for a recordable event.

The optimum number of categories may be based on various factors, such as (i) the size of a graphical user interface (GUI) display used for viewing the categories, (ii) the number of categories that are viewable on a single page of a GUI display, and (iii) a number of descriptors that define a substantial portion of the entire set of recordable events in a way that a user is most likely to search for a series of recordable events within the entire set of recordable events. Other factors may also be determinative in determining the optimum number of categories.

FIG. 2 illustrates an example of an optimum number of categories for a given GUI. In FIG. 2, seven categories are defined. The seven categories are (i) Useful Searches, (ii) Movie Genres, (iii) TV Genres, (iv) Sports, (v) Just For Kids, (vi) News and Weather, and (vii) LifeStyle. Other graphical user interfaces may have an optimum number of categories that is greater than or less than seven categories. Further, the given GUI shown in FIG. 2 may use another set of categories other than the seven categories shown, or a combination of some of the categories shown in FIG. 2 and some categories not shown in FIG. 2.

According to the exemplary embodiment, a category may have one or more sub-categories associated with it. A category, as a descriptor, is less precise of a descriptor as compared to a sub-category, which is more narrowly defined than the category. Thus, a sub-category may be more helpful in locating a series of recordable events as compared to a category. Sub-categories are further associated with recordable events and/or series of recordable events.

In an alternative embodiment, a sub-category may have one or more sub-sub-categories associated with it. A sub-category, as a descriptor, is less precise of a descriptor as compared to a sub-sub-category, which is more narrowly defined than the sub-category. Thus, a sub-sub-category may be more helpful in locating a series of recordable events as compared to a sub-category. Sub-sub-categories are further associated with recordable events and/or series of recordable events.

FIG. 2 also shows a given set of sub-categories for a category described as Useful Searches. As shown in FIG. 2, the given set of sub-categories consists of eight sub-categories. The eight sub-categories of Useful Searchers are (i) TV—Primetime Shows, (ii) TV—Season Premieres, (iii) TV—Season Finales, (iv) TV—Shows in HDTV (high definition television), (v) Sports—Playoff Games, (vi) Movies—Critics Choice, (vii) Movies—Kid Picks, and (viii) Movies—Letterboxed. Letterboxed movies are movies that are presented in a widescreen format, and may appear with black bands at the top and bottom of television screen if the television does not support the widescreen format. Other categories may have a number of sub-categories that is greater than or less than eight sub-categories. Further, the given GUI shown in FIG. 2 may use another set of sub-categories for the category Useful Searches other than the eight categories shown, or a combination of some of the sub-categories shown in FIG. 2 and some sub-categories not shown in FIG. 2.

According to the exemplary embodiment, each sub-category is associated with one or more recordable events and/or one or more series of recordable events. In an alternative embodiment, a category and a sub-category, may each have one or more recordable events or one or more series of recordable events associated with it. A recordable event is an event that may be recorded by a device such as a digital video recorder (DVR). Examples of recordable events include television shows, radio programs, and data content that is downloadable or that may be streamed over the Internet. A series of recordable events may be arranged in any of a variety of configurations. For example, a series of recordable events may be arranged as a series of recordable events having the same show title, such as the television show title "Friends." As another example, a series of recordable events may be arranged as a series of shows to be broadcast on a given channel at a given time, regardless of the show title. Other examples of how a series of recordable events may be arranged are also possible. Further any number of the one or more recordable events and the one or more series of recordable events may be associated more than one category and/or more than one sub category.

More details of recordable events and series of recordable events, that may be associated with a category and a sub-category, are described in the co-pending U.S. patent application Ser. No. 11/030,692 entitled Method and System for Displaying a Series of Recordable Events, which (i) is filed concurrently herewith, (ii) has attorney reference number 04-1096, and (iii) is hereby incorporated by reference.

2. Exemplary Architecture

Figure 3:
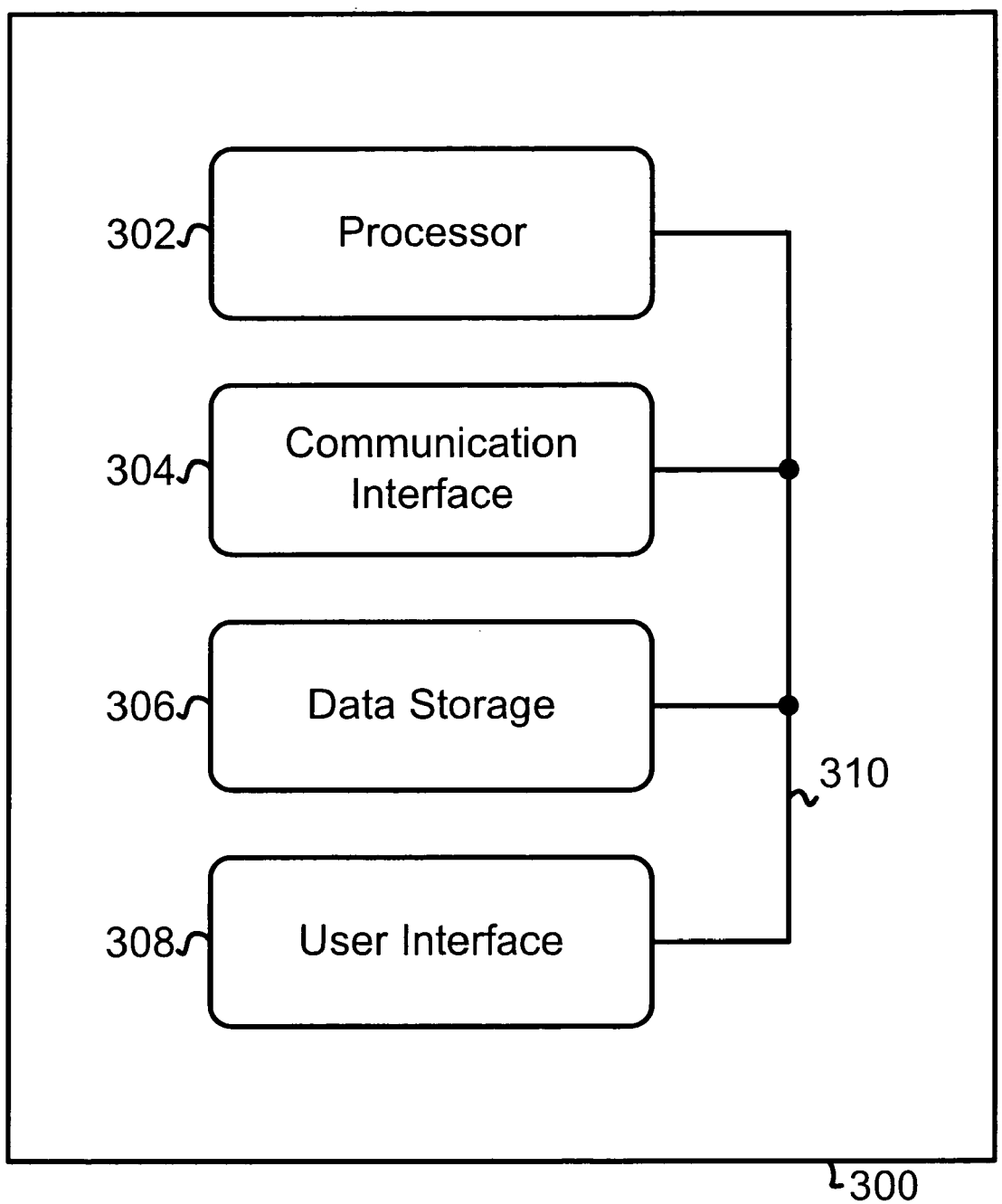
FIG. 3 is a block diagram illustrating an exemplary embodiment of a system for carrying out the present invention.

The block diagram of FIG. 3 depicts a system for selection of a series of recordable events from among a set of recordable events, where the selection system is based on a set of categories of recordable events and a respective set of sub-categories associated with each category of the set of categories. As shown in FIG. 3, the system 300 includes (i) a processor 302, (ii) a communication interface 304, (iii) data storage 306, and (iv) a user interface 308, all linked together via a system bus, network, or other connection mechanism 310.

The processor 302 may include one or more processors, such as a general purpose processor and/or a digital signal processor. The processor 302 executes program instructions that are stored at the data storage 306, and responsively functions to interact with the communication interface 304 and the user interface 308, to facilitate performance of the functions described herein.

The communication interface 304 provides means for receiving data into the system 300. The communication interface 304 may receive various types of data. For example, the communication interface 304 may receive a default set of categories and a respective default set of sub-categories associated with each category. The default set of categories and the default sets of sub-categories may be provided by a manufacturer of the system 300 at the time the system 300 is manufactured. The default set of categories and the default sets of sub-categories may be stored in a non-volatile segment (and/or a non-volatile segment) of data storage 306.

As another example, the communication interface 304 may receive updates for changing (or substituting) the default set of categories with a new set of categories and for changing (or substituting) one or more of the default sets of sub-categories with a respective new set of sub-categories. The communication interface 304 may receive updates when new categories or new sub-categories are defined. For example, the Summer Olympic Games occur every four years. In this regard, a new sub-category Olympics may be defined and may be associated with one or more categories, such as a category labeled Useful Searches and/or a category labeled Sports.

Upon selection of the new sub-category Olympics, a user may be presented with a list of recordable events. In this regard, the recordable events may be events identified as Olympic Games, Olympic News, Olympic Highlights, and History of the Olympics. These recordable events associated with the new sub-category Olympics may be encoded with a tag (identifier) that indicates the recordable events are associated with the new sub-category Olympics.

The tag may be encoded as meta data within the recordable event and/or in the set of recordable events data. Tags may be used for all recordable events and/or the entire set of recordable events data, to associate each of the recordable events with one or more categories, and one or more sub-categories. In this regard, the processor 302 can analyze each tag and display the recordable events encoded with the tag for a given category and a given sub-category, when the given category, and given sub-category, is selected by a user.

As yet another example, the communication interface 304 may receive a signal to revert back to the default set of categories, and/or the default set of sub-categories. Continuing with the example of the Summer Olympic Games above, after the Summer Olympic Games have been completed, there may be less desire by a majority of users to have a sub-category of Olympics. Thus, in response to receiving a signal to revert back to the default set of categories and/or the default set of sub-categories, the processor 302 may execute program instructions to revert back to the default set of categories and/or the default set of sub-categories. Further, the processor 302 may responsively execute program instructions to delete the sub-category Olympics.

The communication interface 304 may receive categories, sub-categories in various ways. As an example, the categories and sub-categories may be received in data arranged according to an extensible markup language (XML). In particular, the received data for the category "Useful Searches" and the sub-categories associated with the category "Useful Searches" may take the form of the XML data shown in table 1.

TABLE 1

<?xml version='1.0' encoding='UTF-8'?>
<Category Name="Useful Searches..."Tag="1">
  <Sub-Category Name="TV-Primetime Shows"Tag="900"/>
  <Sub-Category Name="TV-Season Premieres"Tag="936"/>
  <Sub-Category Name="TV-Season Finales"Tag="935"/>
  <Sub-Category Name="TV-Shows in HDTV"Tag="15"/>
  <Sub-Category Name="Sports-Playoff Games"Tag="923"/>
  <Sub-Category Name="Movies-Critics Choice"Tag="57"/>
  <Sub-Category Name="Movies-Kids Picks"Tag="934"/>
  <Sub-Category Name="Movies-Letterboxed"Tag="31"/>

TABLE 1-continued

<Sub-Category Name="Movies-Subtitles"Tag="59"/>
  <Sub-Category Name="**** Movies"Tag="58"/>
  <Sub-Category Name="*** Movies"Tag="56"/>
  <Sub-Category Name="** Movies"Tag="55"/>

As still yet another example, the communication interface 304 may receive a set of recordable events data. In a first arrangement, the set of recordable events data may be configured as one or more recordable events that each includes a respective tag; The tag allows the processor 302 to associate a respective recordable event with one or more categories, and or one or more sub-categories. Tags are numbers that have been generated on a remote device. Tags represent a set of rules. Examples of the rules include (i) a rule for Prime Time Shows, and (ii) a rule for recordable events categorized as Movies and sub-categorized as Action, so as to identify a type of movie known as action movies. Other examples of rules are also possible.

In a second arrangement, the set of recordable events data may be analyzed by the processor 302 so that tags may be assigned to each recordable event in the set of recordable events data. The processor 302 may further analyze the tag for each recordable event so that each recordable event may be associated with one or more categories, and one or more sub-categories. Thereafter, upon selecting a given category and given sub-category at the GUI, one or more recordable events that are associated with the given category and given sub-category, based on the assigned tags, may be displayed at the GUI.

The communication interface 304 also provides means for transmitting data from the system 300 to a remote device and/or a remote system. The remote device and/or remote system may be operated by a supplier of DVR services and/or a supplier of recordable events. The communication interface 304 may transmit various types of data to the remote device and/or remote system. For example, the transmitted data may include a request to send an updated set of categories, and/or an updated set of sub-categories. As another example, the transmitted data may include a request for the remote device to transmit a recordable event, such as a pay-per-view movie, or a downloadable event via the Internet. Other examples of the data the communication interface 304 may transmit are also possible.

The communication interface 304 may be arranged in various configurations to transmit and/or receive data. For example, the communication interface 304 may be arranged as a wireless interface that receives data encoded within radio-frequency signals broadcast by a terrestrial antenna and/or by a satellite circumnavigating the Earth. As another example, the communication interface 304 may be arranged as a wired interface that receives data encoded within signals transmitted via a traditional copper telephone land-line, or a coaxial cable, such as a cable for routing cable television signals, or a data network cable, such as a category 5 cable or an optical cable. The communication interface 304 may interface to a private network, such as a local area network, or a public-access network, such as the Internet. Other examples of the arrangements for the communication interface 304 are also possible.

The communication interface 304 communicates with a remote device, which may be part of a remote system. The remote device may be a server that communicates with the communication interface 304. The remote device uses a rules engine to evaluate user defined rules and to index the recordable events defined in the set of recordable events data for applicability with one or more categories, and one or more sub-categories. The indexing of the recordable events may include encoding a respective tag (for example, as metadata) for each recordable event defined in the set of recordable events data. In an alternative arrangement, the rules engine may be carried out in the system 300.

An example of program instructions used in carrying out the rules engine is shown below.

```
#Primetime TV Shows
show_type eq "Series"
local_start_time >= 2000
local_end_time <= 2300
affiliate in BroadcastNetworkAffiliates
key !~ /^MV/
then 900
#Kids Picks Movies
key =~ /^MV/
genre =~ /Children/i
mpaa_rating eq 'G'
star_rating eq '***'
or
key =~ /^MV/
genre =~ /Children/i
mpaa_rating eq 'G'
star_rating eq '***+'
or
key =~ /^MV/
genre =~ /Children/i
mpaa_rating eq 'G'
star_rating eq '****'
then 934
# TV Season Finales
premiere eq 'Season Finale'
key =~ /^(SH|EP)/
or
premiere eq 'Series Finale'
key =~ /^(SH|EP)/
then 935
# TV Season Premiers
premiere eq 'Season Premiere'
key =~ /^(SH|EP)/
or
premiere eq 'Series Premiere'
key =~ /^(SH|EP)/
then 936
```

Other examples of the program instructions used in carrying out the rules engine are also possible.

The dynamic nature of defining categories and sub-categories, and the contents of the categories and sub-categories, based on complex criteria, allows the system to receive a large set of recordable events data and to categorize the recordable events, for very simple selection by the user, yet remain relevant even though the large set of recordable events data changes over time.

The data storage 306 may include a computer readable and writeable medium, such as a magnetic disc, an optical disc, organic memory, and/or any other volatile and/or non-volatile mass storage system readable and writable by the processor 302. Alternatively, the data storage 306 includes a combination of one or more segments of computer readable and writable media. In this regard, for example, data storage 306 may include a first segment of computer readable and writable media located in the processor 302 and a second segment of computer readable and writable media remote from the processor 302. As an example, the second segment of computer readable and writable media may be arranged as (i) a portable hard-drive data storage unit, or (ii) an integral hard-drive storage unit, or (iii) a magnetic tape, such as a VHS-format video tape.

Other examples of data storage 306 or segments of the data storage 306 are also possible.

The data storage 306 may store various types of data. For example, the data storage 306 may store one or more sets of categories, such as a default set of categories, and/or an updated set of categories received via the communication interface 304, and/or a reconfigured set of categories. A reconfigured set of categories may be produced by substituting at least some of the categories of a set of categories previously stored in the data storage 306. Substituting the categories may require receiving one or more new categories via the communication interface 304. Other examples of categories stored in data storage 306 are also possible.

As another example, the data storage 306 may store default sets of sub-categories, and/or updated sets of sub-categories received via the communication interface 304, and/or reconfigured sets of sub-categories. The updated sets of sub-categories may include a new sub-category such as the Olympics sub-category described above. The reconfigured sets of sub-categories may be produced by substituting at least some of the sub-categories of a set of sub-categories previously stored in the data storage 306. Substituting the sub-categories may require receiving one or more new sub-categories via the communication interface 304. Other examples of sub-categories stored in the data storage 306 are also possible.

As still yet another example, the data storage 306 may store program instructions executable by the processor 302. In particular, the program instructions may include instructions that are executable to create an updated set of categories in response to a communication that indicates to update a first set of categories. Creating an updated set of categories may include (i) receiving a complete set of categories from a remote server and using the complete set as the updated set of categories, or (ii) receiving categories and updating an existing set of categories with the received categories.

The program instructions may also include instructions that are executable to create an updated set of sub-categories in response to the communication that indicates to update a first set of sub-categories. Creating an updated set of sub-categories may include (i) receiving a complete set of sub-categories from a remote server and using the complete set of sub-categories as the updated set of sub-categories, or (ii) receiving sub-categories and updating an existing set of sub-categories with the received sub-categories.

The user interface 308 provides means for a user to communicate data into the system. As an example, the means for a user to communicate data into the system may include (i) a wireless remote control receiver for receiving wireless communication from a remote control, and/or (ii) a keypad or touch-screen for receiving data input by a user pressing keys correlated with certain data and or functions, and/or (iii) a speech recognition system for receiving data and or commands spoken by a user. Other examples of the means for a user communicating data into the system 300 are also possible.

Various types of data (and/or commands) may be communicated into the system 300 via the user interface 308. As an example, communicating data into the system may include communicating a user request that instructs the system to request (i) an updated set of categories for use in updating a set of categories, and/or (ii) an updated set of sub-categories for use in updating a set of sub-categories.

As another example, communicating data into the system 300 may include communicating user approval for the processor 302 to execute (or the user's disapproval to prevent the processor 302 from executing) program instructions for configuring the selection system to use an updated set of categories and/or one or more updated sets of sub-categories. In this regard, the user interface 308 may display a message that indicates reconfiguration of the selection system is possible and displays a message prompting the user to indicate whether the user approves or disapproves of reconfiguring the selection system. The user may signal his or her approval (or disapproval) by pressing a certain keypad key, by use of a remote control, or by some other means. If the user approves of reconfiguring the selection system, the system 300 reconfigures the system 300. If the user disapproves of reconfiguring the selection system, the system 300 does not reconfigure the system 300.

As yet another example, communicating data into the system 300 may include communicating a selection of a category of a set of categories displayed on the user interface 308 for instructing the system 300 to display a set of sub-categories correlated with the selected category. Thereafter, communicating data into the system 300 may include communicating a selection of a sub-category for instructing the system 300 to display a list that includes recordable events and/or series of recordable events, associated with the selected sub-category. Display of the recordable events allows a user to select a given recordable event and/or to schedule the recreation of the given recordable event. Other examples of the types of data that may be communicated into the system 300 are also possible.

The user interface 308 also provides means for communicating data to a user of the system 300. In this regard, the data communicated to the user may be data that is (i) visual on a display, such as a touch screen, a liquid crystal display, a cathode ray tube, or a plasma screen, or (ii) audible via a speaker. Other examples of the user interface 308 providing means for communicating data to the user of the system 300 are also possible.

Various types of data may be communicated to a user from the system 300. For example, the user interface 308 may display a set of categories on a GUI. Displaying a set of categories provides a convenient method for a user to begin searching for a given type of recordable event. The set of categories displayed via a user interface 308 may be a default set of categories that was originally programmed into the system 300, or a set of categories received via the communication interface 304 to update the default set of recordable events, or another set of categories.

As another example, the user interface 308 may display a respective set of sub-categories for a given category in response to receiving a user selection of the given category. Displaying a set of sub-categories on the user interface 308 provides a convenient method for a user to fine-tune his or her search for a given type of recordable event. The sets of sub-categories displayed via the user interface 308 may be default sets of sub-categories that were originally programmed into the system 300, or sets of sub-categories received via the communication interface 304 to update the default sets of sub-categories, or another set of categories.

The user interface 308 may display categories and sub-categories in various ways. As shown in FIG. 2, one example is to display the categories on the left-hand side of the GUI and the sub-categories on the right-hand side of the GUI. In FIG. 2, the left-hand side of the GUI is active and the user may scroll up or down the set of categories to select one of the seven categories. As shown, in FIG. 2, a first category named "Useful Searches" is selected and 8 sub-categories are displayed on the right-hand side of the GUI.

Figure 4:
FIG. 4 depicts a GUI displaying a show search screen that uses seven categories and a first of the seven categories (Useful Searches) selected and a sub-category (TV-Primetime Shows) selected.

In FIG. 4, the right-hand side of the GUI is active and the user may scroll up of down the set of sub-categories to select one of the eight sub-categories. In this example, when the right-hand side of the GUI is active, the left-hand side of the GUI is still viewable. In this regard, the left-hand side of the GUI provides an indication of the search path currently being used by the user.

As shown in FIG. 4, a first sub-category named "TV-Primetime Shows" of the first category named Useful Searches, is selected. In this regard, the first sub-category is highlighted as compared to the remaining 7 sub-categories displayed on the right hand side of the GUI. The first sub-category (when highlighted) includes an arrow that indicates that more information (or more options) pertaining to the first sub-category is available.

Figure 5:
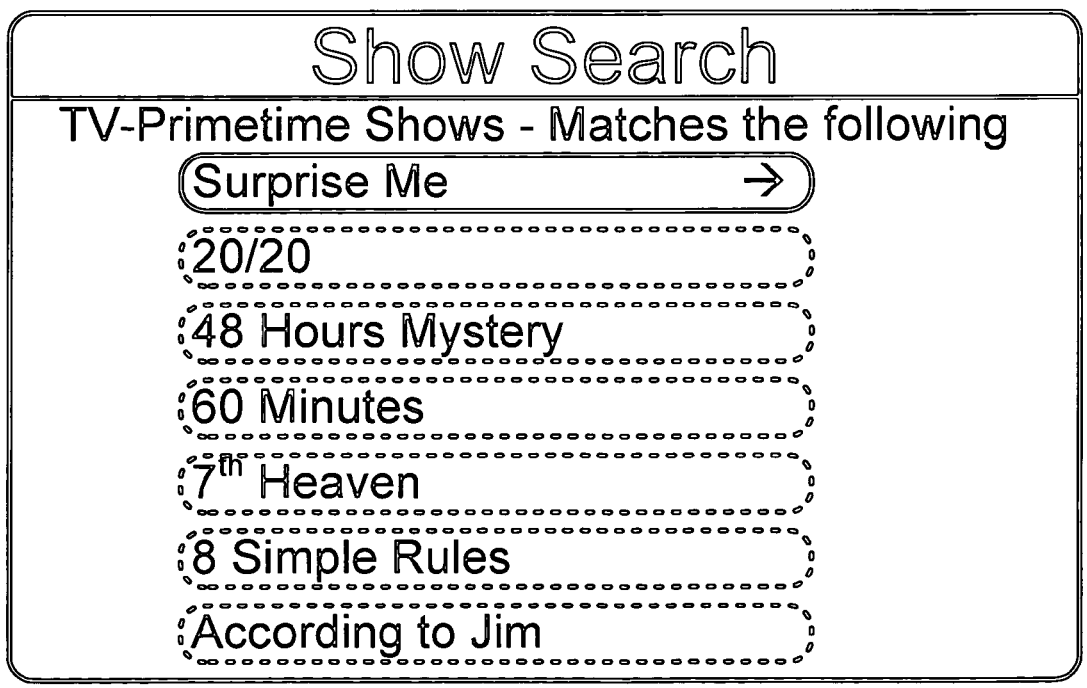
FIG. 5 depicts a GUI displaying a show search result for TV-Primetime Shows.

In FIG. 5, a GUI display shows the results of selecting the first sub-category (TV—Primetime shows) of the first category (Useful Searches). In this regard, the GUI displays a "Surprise Me!" option and a set of Primetime shows in alphabetical order, where show titles starting with numbers (e.g. 20/20, 48 Hours Mystery, and 60 Minutes) are at the beginning of the set, followed by show titles starting with letters. Other Primetime shows may be displayed on the GUI by (i) entering letters of a show title, (ii) using a scroll up feature, (iii) using a scroll down feature, (iv) using a page up feature, or (v) using a page down feature. Other examples for how to display the other Primetime shows on the GUI are also possible.

Figure 6:
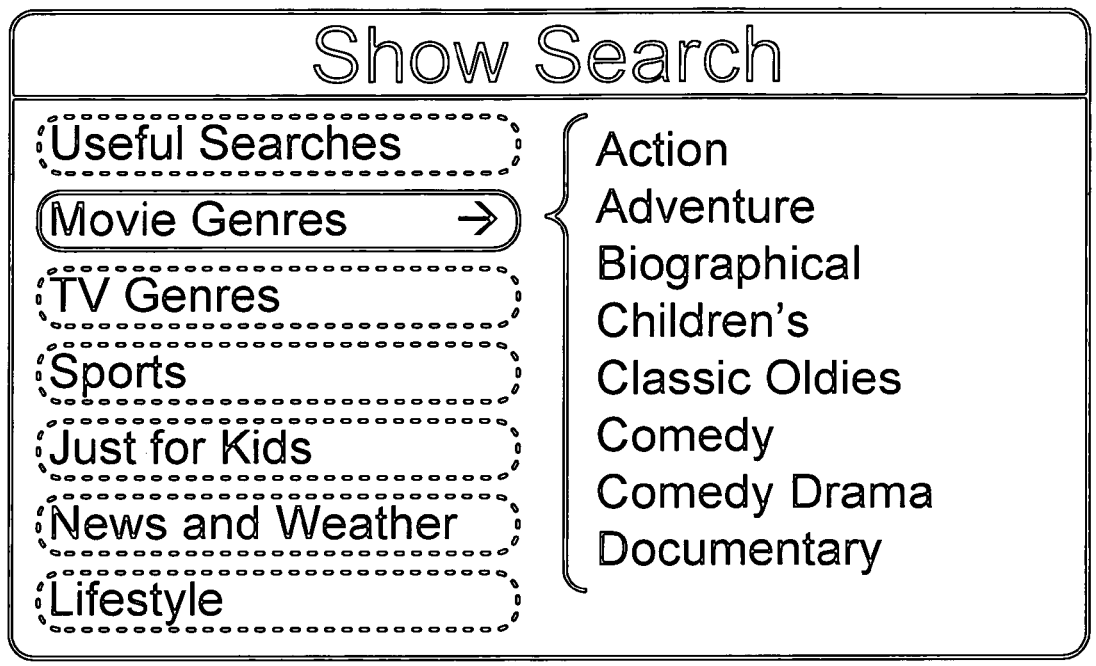
FIG. 6 depicts a GUI displaying a set of categories having a category Movie Genres.
Figure 7:
FIG. 7 depicts a GUI displaying a set of sub-categories where a sub-category Action of the category Movie Genres, is highlighted.

In FIG. 6, a GUI display shows a set of categories that includes a category labeled Movie Genres. In FIG. 6, the left-side of the GUI is active, which allows a user to scroll up or scroll down to other categories in the list of categories. In FIG. 7, a GUI display shows a set of categories on the left side of the GUI where a category Movie Genres is selected, and a right side of the GUI that is active. With the right side of the GUI active, a user may scroll up or scroll down to select a given sub-category. Alternatively, with right side of the GUI active, a user may select to view a set of recordable events for a selected sub-category, or select the left side of the GUI to be active so as to be able to select another of the displayed categories.

As shown in FIG. 7, a set of eight sub-categories are displayed for the category Movie Genres. The set of sub-categories includes sub-categories defined as Action, Adventure, Biographical, Children's, Classic Olives, Comedy, Comedy Drama, and Documentary. Additional sub-categories may be also be defined for the category Movie Genres. Displaying the additional sub-categories may occur by various methods, such as by moving the highlighted bar on the Action sub-category up or down in GUI display, or by using a feature to select another page of sub-categories. Other examples of methods to display additional sub-categories are also possible.

Figure 8:
FIG. 8 depicts a GUI displaying a list of action movies located by performing a show search under the category Movie Genres and sub-category Action.

FIG. 8 shows a list of movies associated with (i) the category Movie Genres, and (ii) the sub-category Action. Six action movies are shown GUI display. Additional action movies associated with (i) the category Movie Genres, and (ii) the sub-category Action may also be available for displaying on the GUI. Displaying the additional action movies may occurs by (i) selecting another page of action movies (for example, by using a page up or page down feature that selects the next incremental page of action movies), or (ii) using a scroll up of scroll down feature to move the highlighted bar shown on the Surprise Me! label up or down within the GUI display.

The Surprise Me feature provides a means for a user of the system 300 to schedule shows to be recorded based on a predetermined search criteria and a set of rules based on the predetermined search criteria. The Surprise Me feature allows for recording recordable events based on the predetermined search criteria and the set of rules so long as no other recordable events are scheduled to be recorded. The Surprise Me feature may include a time limit, such as 4 hours, so that only 4 hours of shows based on the predetermined search criteria and the set of rules are recorded. As shown in FIG. 8, selection of the Surprise Me feature may result in recreation of one or more of the action movies shown on the GUI display and/or one or more of the additional action movies that may be displayed on the GUI display.

The system 300 may be arranged in other configurations as well. For example, the system 300 may be arranged as described in the co-pending U.S. patent application Ser. No. 11/030,692 entitled Method and System for Displaying a Series of Recordable Events having attorney reference number 04-1096.

3. Exemplary Operation

According to the exemplary embodiment, the system 300 receives a first set of categories, a respective first set of sub-categories for each category in the first set, and a first communication for updating the first set of categories and/or a given first set of sub-categories from among the respective set of sub-categories. After receiving the first communication, the processor may execute program instructions for creating a second set of categories for displaying at the user interface instead of the first set of categories, and/or creating a second set of sub-categories for displaying at the user interface instead of the given first set of sub-categories.

Figure 9:
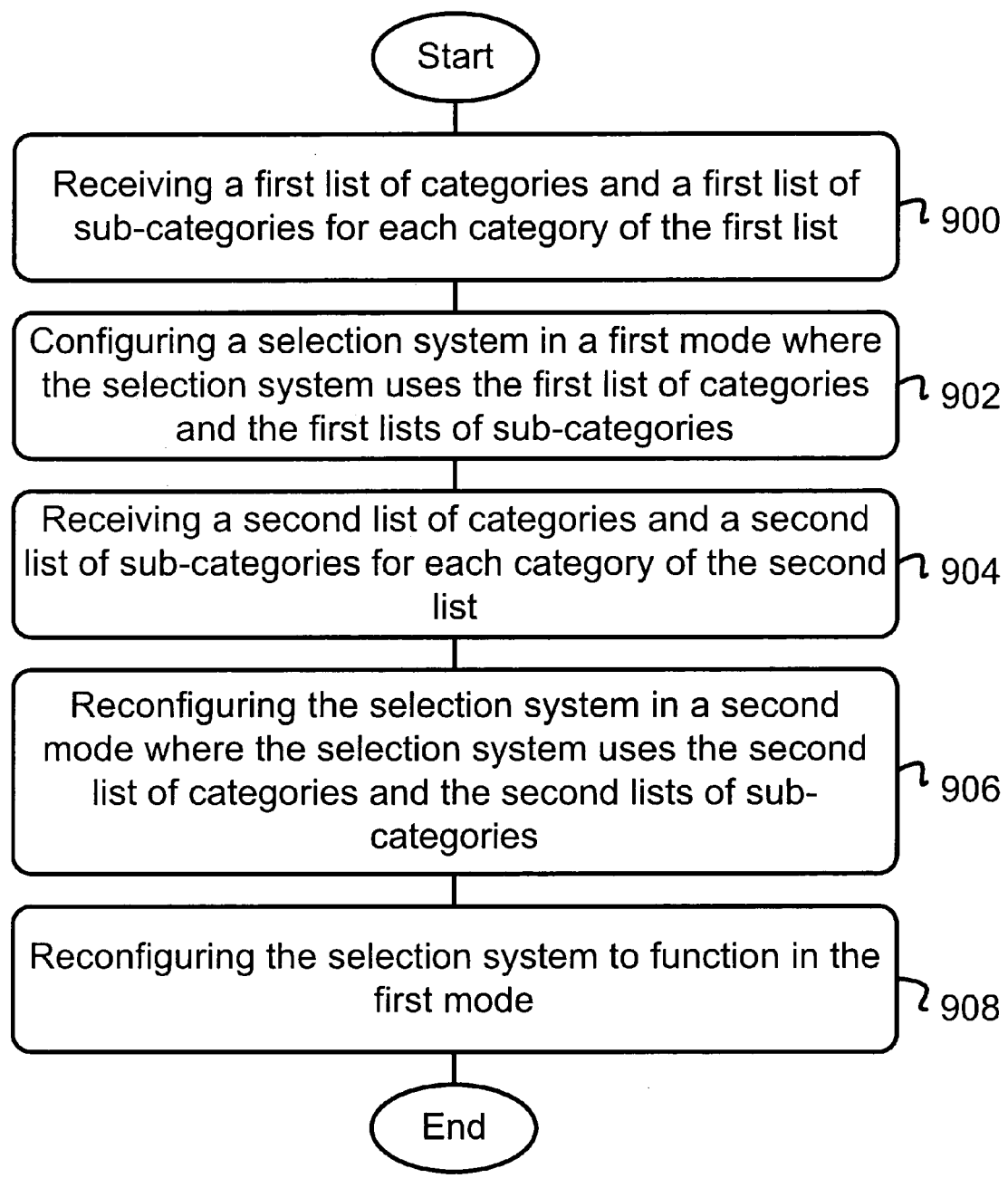
FIG. 9 is a flow chart depicting functions that can be carried out in accordance with an exemplary embodiment of the present invention.

FIG. 9 is a flow chart provided to illustrate some of these functions. As shown in FIG. 9, at block 900, a first set of categories and a first set of sub-categories for each category of the first set of categories are received. The first set of categories may be a default set of categories downloaded into the system by the manufacturer at the time the system is manufactured. The first set of sub-categories may be a default set of sub-categories downloaded into the system by the manufacturer at the time the system is manufactured. These first sets of categories and sub-categories may be received via a communication interface, such as the communication interface 304 shown in FIG. 3. Other examples of a device or system that is arranged to receive the first set of categories and a first set of sub-categories are also possible.

Receiving the first set of categories and the first set of sub-categories for each category of the first set may be carried out using any of a variety of methods. For example, receiving the first sets may occur via a wireless or wired communication interface. As another example, receiving the first sets may be in response to a request for the first sets, or performed automatically at a designated time. In this regard, receiving the set of first sets may occur at a time, such as 1:00 AM Eastern Standard Time, when there is a lesser amount of communications occurring via a network that interfaces with the communication interface. Other examples of methods available for receiving the first sets are also possible.

After receiving the first set of categories and the first set of sub-categories for each category of the first set, the first set of categories and the first set of sub-categories may be stored in data storage of the system/device that receives the first sets.

The first set of categories may include seven categories, such as the seven categories shown in FIG. 2 on the left-hand side of the GUI. Alternatively, the first set of categories may include some number of categories that is greater than or less than seven. Further, the first set of categories may include categories that use different words to describe the categories as compared to the words use to describe the categories shown in FIG. 2. Further still, the first of set of categories may use another means, such as a pictorial icon, to identify a category instead of words.

At block 902, a selection system is configured to function in a first mode in which the selection system uses the first set of categories and the first set of sub-categories. A processor may execute program instructions to carry out configuring the selection system. Configuring the selection system in the first mode may be performed at various stages of a device's life-cycle for a device that includes the selection system. For example, configuring the selection system in the first mode may occur during the time that the device is being manufactured. As another example, configuring the system in the first mode may occur after a user connects the device to a power source, and/or to a network coupled to a remote server that sends updated sets of categories and updated sets of sub-categories to a device, for the first time. Other examples of configuring a selection system in the first mode during the life-cycle of a device are also possible.

While the selection system is configured in the first mode, the device may receive a signal (a first signal) which indicates that a set of categories should be provided to a display. In response to receiving the first signal, the device provides the first set of categories to the display when the selection system is configured in the first mode. The first signal may be generated in response to a user starting a search for recordable events.

Further, while the selection system is configured in the first mode, the device may receive a signal (a second signal) which indicates that a given set of sub-categories associated with a given category should be provided to a display. In response to receiving the second signal, the device provides the given set of sub-categories to the display when the selection system is configured in the second mode. The second signal may generated in response to a user getting more specific in his or her search for recordable events.

At block 904, a second set of categories and a second set of sub-categories for each category of the second set are received. The second set of categories may be an updated set of categories downloaded into the system from a service provider after the system is put into service. The second set of sub-categories may be an updated set of sub-categories downloaded into the system from a service provider after the system is put into service. The service provider, which provides the data to the communication interface as described above, may or may not be the manufacturer of the system.

Alternatively, only the second set of categories may be received, or only the second set of sub-categories for each category of the second set may be received, or only the second set of sub-categories for some of the categories of the second set (or for the first set) may be received. Other examples of sets of categories and/or sets of sub-categories that may be received are also possible.

Receiving the second sets of categories and/or the second sets of sub-categories may occur after a service provider produces the second sets in response to learning about the future occurrence of a special series of recordable events. Other examples of reasons why a service provider produces second sets of categories and/or sub-categories, for transmission in turn to a device using a selection system based on categories and sub-categories, are also possible.

At block 906, the selection system is reconfigured to function in a second mode. In the second mode, the selection system uses the second set of categories (instead of the first set of categories) and the second set of sub-categories (instead of the first set of sub-categories).

While the selection system is configured in the second mode, the device may receive the first signal. In response to receiving the first signal, the device provides the second set of categories to the display when the selection system is configured in the second mode.

Further, while the selection system is configured in the second mode, the device may receive the second signal. In response to receiving the second signal, the device provides one of the second sets of sub-categories to the display when the selection system is configured in the second mode.

At block 908, the selection system is reconfigured to function in the first mode. The selection system may be reconfigured to the first mode from the second mode for various reasons. For example, it may no longer be desirable to display the second set of categories because the number of recordable events associated with the sub-categories associated with the second set of categories may have reduced drastically. As another example, it may no longer be desirable to display the second set of sub-categories because the number of recordable events associated with the second set of categories may have reduced drastically. In particular, this may occur when the category or sub-categories are related to recordable events that are seasonal, such as the Olympics, the National Football League Playoff, and recordable events associated with holidays. Other examples of reasons for reconfiguring the selection system to the first mode from the second mode are also possible.

Figure 10:
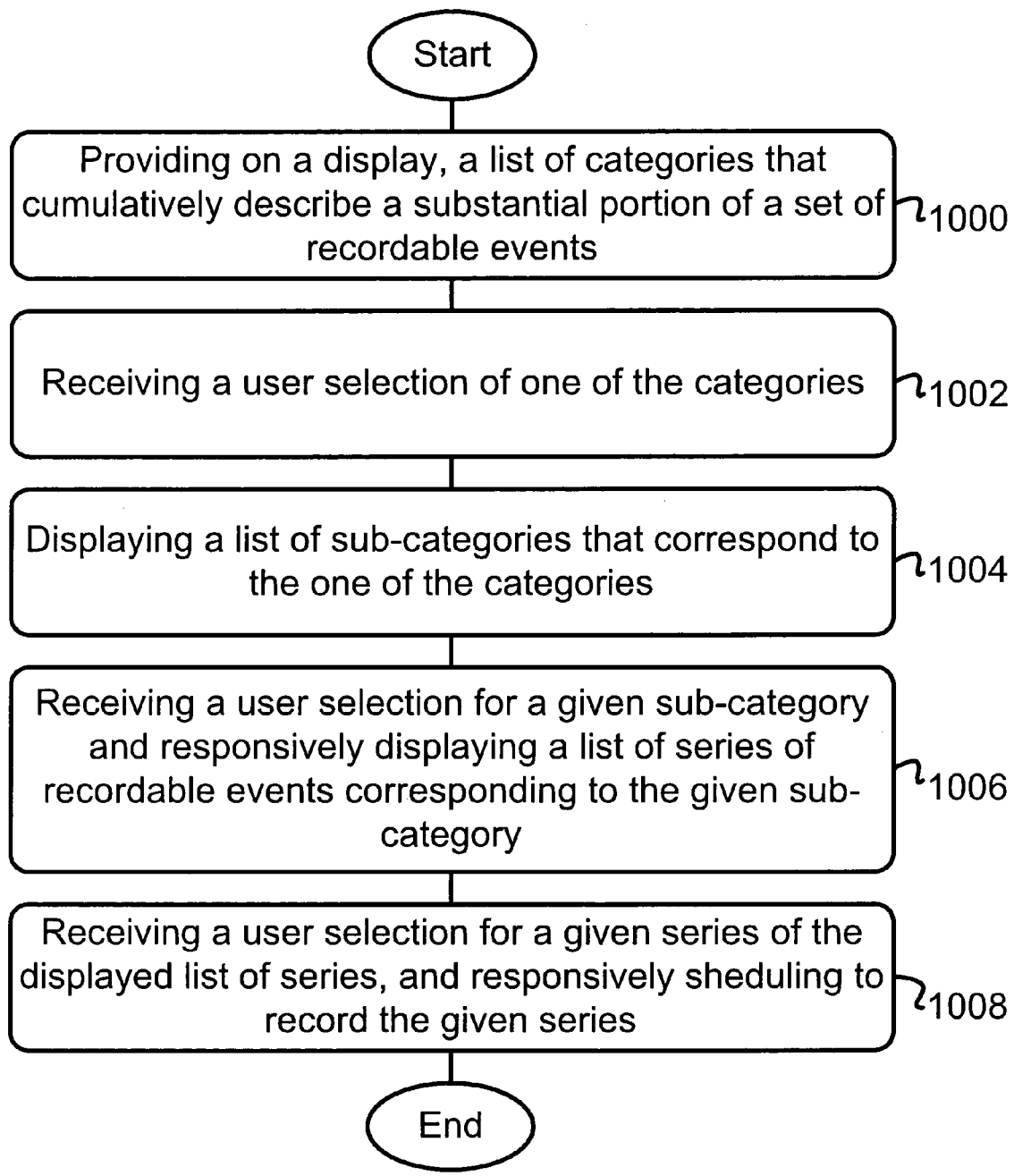
FIG. 10 is another flow chart depicting other functions that can be carried out in accordance with the exemplary embodiment of the present invention.

Turning to FIG. 10, a flow chart illustrating another set of functions that may be carried out with the exemplary embodiment is shown.

At block 1000, a set of categories that cumulatively describe a substantial portion of a set of recordable events is provided on a display. The set of categories may be a default set of categories that is stored in data storage of a device by the manufacturer of the device. The device that stores the default set of categories provides the default set of categories to the display.

Alternatively, the set of categories provided on the display may be an updated set of categories that is received at the device from a remote device, such as a remote server. The device may store both the default set of categories and the updated set of categories, or just one of the set of categories. The device may display any of the sets of categories that are stored within the device.

The remote server may function to transmit an updated set of sub-categories that correspond to a given category of a default set of categories or an updated set of categories. In this regard, the device may receive the updated set of sub-categories, store the updated set of sub-categories in data storage, and use the updated set of sub-categories as a substitute set of sub-categories instead of the default set of sub-categories. Other examples, of how the device receives an updated set of categories or an updated set of sub-categories are also possible.

Further, the remote server may be operated by a service provider that provides a set of recordable events data for use in recording recordable events. The data of the set of recordable events data describes recordable events. At least a portion of the recordable events data may include an identifier for a respective recordable event. Each identifier indicates at least one category and at least one sub-category. An identifier may be encoded as metadata within the set of recordable events data.

Further still, the remote server may function in coordination with a wireless or wired communication interface so as to transmit the set of recordable events data and/or an updated set of categories to the device via a wireless or wired network.

Various types of displays may be used to display the set of categories or the updated set of categories. The display may be a display of a user interface of a recordable event recorder, such as a digital video recorder, or of a device communicatively coupled to a recordable event recorder, such as a television, computer, or an audio receiver, that receives the updated set of categories from the remote server. The display may be arranged as a cathode ray tube, a liquid crystal display, an organic light emitting diode display, or some other form of display.

At block 1002, a first user selection is received, where the first user selection indicates which category has been selected. A user selection, such as the first user selection, may be received by any of a variety of means for receiving a user selection. For example, a user selection may be received via a wireless signal transmitted from a remote control device. As another example, the user selection may be received over a wired network that is coupled to the device that receives the user selection. As yet another example, the user selection may be received in response to a user using a keypad, or other device, on the device that receives the user selection.

At block 1004, a set of sub-categories that correspond to the selected category as indicated by the first user selection, is provided on a display. The set of sub-categories may be a default set of sub-categories or an updated set of sub-categories sent to the displaying device from a remote server.

At block 1006, a second user selection is received, where the second user selection indicates which sub category has been selected. In response to receiving the second selection, a set of series of recordable events (or another set of sub-categories) corresponding to the selected sub-category is displayed. The set of series of recordable events may include series of recordable events that have an identifier corresponding to the selected category and the selected sub-category.

At block 1008, a third user selection is received, where the third user selection indicates which series from among the displayed set of series is selected. In response, the selected series is scheduled for recreation. Scheduling the series for recreation may involve a processor executing program instructions that provide for scheduling a recordable event recorder to record the recordable event at a designated time(s) as indicated by the recordable events data. Thereafter, at the designated time(s), the recordable event recorder records a recordable event of the selected series.

Further, a function to revert back to a previously-used set of categories, and/or to a previously-used set of sub-categories, may be carried out after a device has been reconfigured to use an updated set of categories, and/or an updated set of sub-categories. Any or all of the previously-used categories, previously-used sub-categories, may or may not have actually been used by a user, but have at least been received into the device and stored at data storage within the device.

The function to revert back may take place after a given period of time has passed, or at a given time on a given day. Further the function to revert back may be based on feedback that a remote server receives from a plurality of systems. In this regard, the feedback may be based on how often a given category, or a given set of sub-categories are used.

Additionally, a method of selection among a set of recordable events comprises: (i) providing on a display of a local device, a set of categories that cumulatively describe a substantial portion of a set of recordable events, (ii) receiving a user selection of a given category of the set of categories, (iii) displaying a set of sub-categories corresponding to the given category, wherein the local device is configured to receive updates from a remote server, and wherein the remote server may reconfigure the categories of the set of categories arid/or one or more of the sub-categories of the set of sub-categories, (iv) receiving a set of recordable events data that describes the set of recordable events, wherein each recordable event of at least a substantial portion of the recordable events identified in the set of recordable events data is correlated with an identifier, wherein each identifier indicates at least one category and at least one sub-category, and (v) analyzing the set of recordable events data and the identifier for each recordable event, for categorizing each recordable event into the category(ies) and the sub-category(ies) identified by the identifier, and for displaying a descriptor for each of the one or more sets of recordable events that are categorized into a given category and a given sub-category in response to receiving a user selection for the given category and the given sub-category.

4. Conclusion

An exemplary embodiment of the present invention has been described above. Those skilled in the art will understand, however, that changes and modifications may be made to the embodiment described without departing from the true scope and spirit of the present invention, which is defined by the claims.

We claim:

1. A method for configuring a selection system based on categories of recordable events and sub-categories of the categories, the method comprising:
    receiving at the selection system a first set of categories and a respective first set of sub-categories for each of the categories of the first set of categories;
    configuring the selection system to function in a first mode in which the selection system uses the first set of categories and the respective first sets of sub-categories to guide user selection of recordable events;
    receiving at the selection system a second set of categories and a respective second set of sub-categories for each of the categories of the second set of categories; and
    configuring the selection system to function in a second mode in which the selection system uses the second set of categories instead of the first set of categories and the respective second sets of sub-categories instead of the first sets of sub-categories to guide user selection of recordable events,
    wherein the second set of categories includes a category not included within the first set of categories and the second sets of sub-categories includes a sub-category not included within the first sets of sub-categories.

2. The method of claim 1, further comprising:
    storing in data storage of the selection system the received first set of categories and the first sets of sub-categories, and
    storing in the data storage of the selection system the received second set of categories and the second sets of sub-categories.

3. The method of claim 1, further comprising reverting back to the first set of categories and the first set of sub-categories after a given period of time has passed.

4. The method of claim 1, further comprising:
    displaying the first set of categories in response to receiving a first signal when the selection system is configured to function in the first mode, wherein the first signal indicates a set of categories should be displayed;
    displaying the second set of categories in response to receiving the first signal when the selection system is configured to function in the second mode;
    displaying a given first set of sub-categories of a given category of the first set in response to receiving a second signal when the selection system is configured to function in the first mode, wherein the second signal indicates a set of sub-categories should be displayed; and
    displaying a given second set of sub-categories from among the respective second sets of sub-categories in response to receiving the second signal when the selection system is configured to function in the second mode.

5. The method of claim 1, further comprising reconfiguring the selection system to function in the first mode.

6. The method of claim 1, further comprising reverting back to the first set of categories and the first sets of sub-categories at a given time on a given day.

7. A system for selection of recordable events from among a set of recordable events, the system comprising:
    a communication interface for receiving (i) a first set of categories of recordable events, (ii) a first set of sub-categories of recordable events for a given category of the first set of categories, and (iii) a communication for creating a second set of sub-categories of recordable events for the given category of the first set of categories;
    a processor communicatively coupled to the communication interface, the processor for executing a set of program instructions;
    data storage communicatively coupled to the processor, the data storage for storing (i) the first set of categories, (ii) the first set of sub-categories, (iii) the set of program instructions, wherein the set of program instructions include instructions, executable in response to receiving the communication, for creating a second set of sub-categories of recordable events for the given category of the first set of categories, and (iv) the second set of sub-categories; and
    a user interface for displaying (i) the first set of categories, (ii) the first set of sub-categories in response to receiving a user selection of the given category prior to creation of the second set of sub-categories, and (iii) the second set of sub-categories in response to receiving a user selection of the given category after creation of the second set of sub-categories.

8. The system of claim 7, wherein the communication interface includes an interface selected from the group consisting of (i) a cable television interface, (ii) a radio-frequency interface for receiving signals from at least a terrestrial transmitter, (iii) a radio-frequency interface for receiving signals from at least a non-terrestrial transmitter, (iv) a land-line telephone system telephone line, and (v) an Internet connection.

9. The system of claim 7, wherein the communication interface is arranged to receive a set of recordable events data, wherein each recordable event of at least a substantial portion of the recordable events identified in the set of recordable events data is correlated with an identifier, and wherein each identifier indicates at least one category and at least one sub-category.

10. The system of claim 9, wherein the recordable events are selected from the group consisting of (i) television shows, (ii) radio programs, and (iii) Internet transmissions.

11. The system of claim 9, wherein the user interface is arranged to (i) receive a user selection of a sub-category, and responsively display a set of one or more sets of recordable events based on identifiers correlated with the selected sub-category, and (ii) receive a user selection of a given set of recordable events of the one or more sets of recordable events, and responsively signal the processor to schedule the given set of recordable events to be recorded.

12. The system of claim 7, wherein the user interface is arranged to display a message that a user must affirmatively respond to before the processor executes the program instructions for creating the second set of sub-categories.

13. The system of claim 7, wherein the program instructions further include instructions for reverting back to displaying the first set of sub-categories instead of the second set of sub-categories, wherein the instructions to revert back are executed after a pre-defined period of time has passed.

14. The system of claim 7, wherein the set of program instructions also include instructions, executable in response to receiving the communication, for creating a second set of categories of recordable events for displaying at the user interface instead of the first set of categories.

15. A method of selection among a set of recordable events, the method comprising:

receiving data describing each recordable event of the set of recordable events, wherein the data includes for each recordable event an identifier that indicates at least one category and at least one sub-category;

using the identifier for each recordable event to associate that recordable event with a category and a sub-category;

displaying a set of categories;

receiving a user selection of a given category of the displayed set of categories, and responsively displaying a set of sub-categories corresponding to the given category;

receiving a user selection of a displayed sub-category and responsively displaying a descriptor for at least one recordable event of the set of recordable events associated with the selected sub-category; and receiving a user selection of a displayed descriptor for a given recordable event and responsively scheduling to record the given recordable event.

16. The method of claim 15, wherein the identifier for each recordable event is a numeric identifier.

17. The method of claim 15, wherein the given recordable event is a series of recordable events.

18. The method of claim 15, wherein the given recordable event is a single recordable event.

* * * * *